United States Patent [19]

Toyota et al.

[11] Patent Number: 5,568,733
[45] Date of Patent: Oct. 29, 1996

[54] AIR CONDITIONER

[75] Inventors: Mitsuru Toyota, Gunma-ken; Hajime Takada, Saitama-ken; Katsuhiro Ohkubo; Hiroyuki Nunokawa, both of Gunma-ken, all of Japan

[73] Assignee: Sanyo Electric Co., Ltd., Osaka, Japan

[21] Appl. No.: 536,440

[22] Filed: Sep. 29, 1995

[30] Foreign Application Priority Data

Oct. 5, 1994 [JP] Japan .................................... 6-241386

[51] Int. Cl.⁶ .................................. F24F 3/14; F25B 1/00
[52] U.S. Cl. ........................ 62/228.4; 62/230; 236/78 D
[58] Field of Search ............................... 62/228.4, 228.5, 62/230; 236/78 D

[56] References Cited

U.S. PATENT DOCUMENTS

5,372,015  12/1994  Suzuki et al. ........................ 62/228.4
5,410,890   5/1995  Arima .................................... 62/228.4

*Primary Examiner*—William E. Wayner
*Attorney, Agent, or Firm*—Darby & Darby, P.C.

[57] ABSTRACT

An air conditioner includes a means for detecting a frequency for controlling an AC motor of a compressor, a means for determining whether the frequency during operation converges to within a predetermined range, of the frequency required to maintain the designated temperature, and a means for shifting the designated temperature by a predetermined temperature when the frequency converges to the predetermined range. The temperature is shifted when the frequency decreases and converges to the predetermined range while the air conditioner operation causes the room temperature to approach the designated temperature. Thus, even if the body temperature of a user decreases because, for example, he is sleeping, the stable state of the operation can be accurately determined and thereby a comfortable temperature is maintained.

20 Claims, 8 Drawing Sheets

FIG. 2

204 CROSS FLOW FAN

FIG. 3

26 COMPRESSOR
70E FAN MOTOR

AIR CONDITIONER

BACKGROUND OF THE INVENTION

The present invention relates to an air conditioner for exchanging heat with a refrigerant so as to adjust a room temperature to a designated temperature and for shifting a designated temperature to a predetermined temperature under a predetermined condition when a user is sleeping.

An air conditioner has a compressor for compressing a refrigerant it executes a refrigerating cycle during which it exchanges heat with the refrigerant so as to execute a controlled operation for causing the room temperature to approach the designated temperature.

A conventional air conditioner performs the following control operation for causing the room temperature to approach the designated temperature: The air conditioner performs a fuzzy operation corresponding to the difference $\Delta t$ between the designated temperature and the room temperature, and the variation thereof. It also calculates an increase/decrease in the frequency controlling an AC motor of a compressor. Corresponding to the increase/decrease in the frequency, the air conditioner increases or decreases the operation power of the AC motor so as to cause the room temperature to asymptotically approach the designated temperature. In addition, the air conditioner compensates the real operation power for various factors, such as the current consumption, the temperature of the compressor, and the outside temperature at that time.

However, when the air conditioner performs the control operation while the user is sleeping, due to the fact that the body temperature of the user decreases while he is sleeping, it cannot provide the user with a comfortable sleeping environment. In other words, the user designates a temperature while he is awake, not a temperature while he is sleeping. When the body temperature of the user decreases while he is sleeping, he feels too cold in a cooling mode of the air conditioner and too hot in a heating mode.

To solve such a problem, when a conventional air conditioner determines that the room temperature accords with the designated temperature, it increases the designated temperature to a predetermined temperature when in the cooling mode and decreases the designated temperature to another predetermined temperature in the heating mode so as to handle a desirable temperature change during sleeping.

It takes a long time until the room temperature reaches a designated temperature. Thus, the room temperature does not easily accord with the designated temperature. Consequently, it is very difficult to determine whether the room temperature accords with the desired temperature. When the room temperature approaches a predetermined range of the desired temperature, the air conditioner determines that the room temperature accords with the desired temperature and performs the above-described temperature shift control.

However, when the amount of the load of the air conditioner is balanced with the operating power, the air conditioner tries to converge to the balanced state. In other words, the air conditioner stably operates in the condition that the room temperature does not accord with the designated temperature. In this case, the air conditioner does not perform the above-described temperature shift control. Thus, the air conditioner cannot provide the user with a temperature corresponding to his decreased body temperature.

SUMMARY OF THE INVENTION

The present invention is made from the above-described point of view. An object of the present invention is to properly perform the temperature shift control in the stable operating state for improving sleeping comfort and to properly perform the designated temperature shift control for energy saving.

The present invention is an air conditioner for varying air conditioning power and for causing a room temperature to approach a designated temperature, comprising (i) a determining means for determining whether or not the conditioning power that is operating approaches a predetermined range of the air conditioning power required for maintaining the desired temperature and for outputting a corresponding signal, and (ii) a compensating means for compensating the desired temperature corresponding to the signal that is output from the determining means.

According to the present invention, when the air conditioner operates to cause the room temperature to approach the desired temperature, the air conditioning power necessary for the control operation gradually approaches the air conditioning power for maintaining the desired temperature. In this case, when the air conditioning power at the present time approaches a predetermined range of the air conditioning power for maintaining the desired temperature, the desired temperature is compensated. Thus, a situation where a proper desired temperature becomes an improper temperature due to a variation of the body temperature of the user can be prevented. In addition, when the control operation becomes stable in the condition that the room temperature does not accord with the desired temperature, if it is determined that the air conditioning power during the control operation approaches the air conditioning power for maintaining the desired temperature, the desired temperature is compensated. Thus, even if the control operation becomes stable, since the desired temperature is properly compensated, the air conditioner can provide the user with a comfortable sleep environment.

These and other objects, features and advantages of the present invention will become more apparent in light of the following detailed description of a best mode embodiment thereof, as illustrated in the accompanying drawings.

DETAILED DESCRIPTION OF PREFERRED EMBODIMENT

Figure 1:
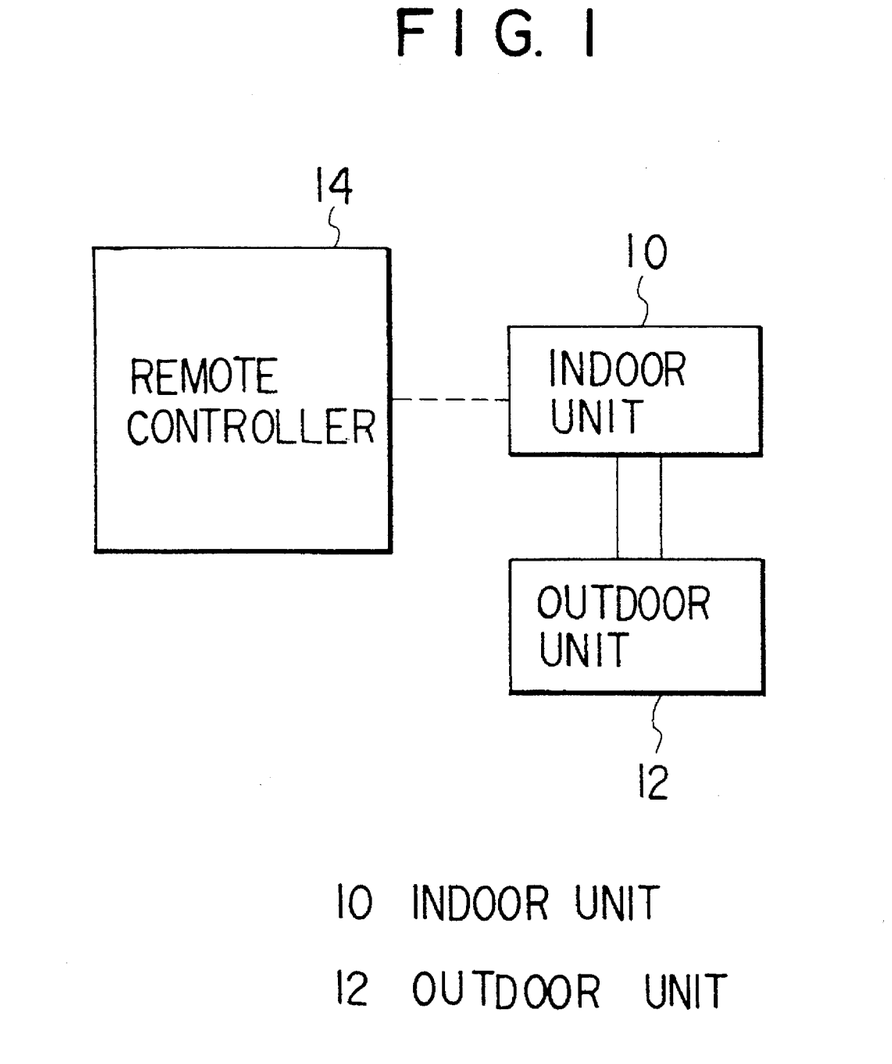
FIG. 1 is a block diagram showing an air conditioner according to an embodiment of the present invention.

Next, with reference to the accompanying drawings, an embodiment of the present invention will be described. FIG.

1 shows an air conditioner according to the embodiment of the present invention. The air conditioner comprises an indoor unit 10, an outdoor unit 12, and a remote controller 14. The indoor unit 10 and the outdoor unit 12 each have a refrigerant circulating path for circulating a refrigerant. The remote controller 14 sends operation signals as infrared rays to the air conditioner so as to remotely control it.

The remote controller 14 has various operation keys (switches) for turning on/off the power, selecting cooling/heating modes, designating temperature, designating timer, and so forth. With the operation keys, corresponding operation signals are output to the air conditioner. The remote controller 14 has air amount designating keys. With the air amount designating keys, the user can select the air amount from "WEAK", "MEDIUM", and "STRONG".

In this embodiment, an air conditioner that has the three levels of air amount will be used as an example. However, the above-described three levels of air amount are basic exemplary construction in this embodiment. Thus, the embodiment can be applied to other constructions in which the air amount is varied in other levels (including for example "breeze", "high power", etc.), or the air amount is gradually varied rather than changed in the fixed levels.

In addition, the remote controller 14 according to the embodiment has a "sleep mode" designating key. With the "sleep mode" designating key, a program for controlling air amount, temperature, and so forth for a comfortable sleeping environment is executed.

In the sleep mode, due to the fact that the body temperature of the user who is sleeping is lower than the body temperature of a user who is awake, a function for shifting the room temperature to a lower temperature than the designated temperature in the cooling mode and to a higher temperature than the designated temperature in the heating mode is provided.

Figure 4:
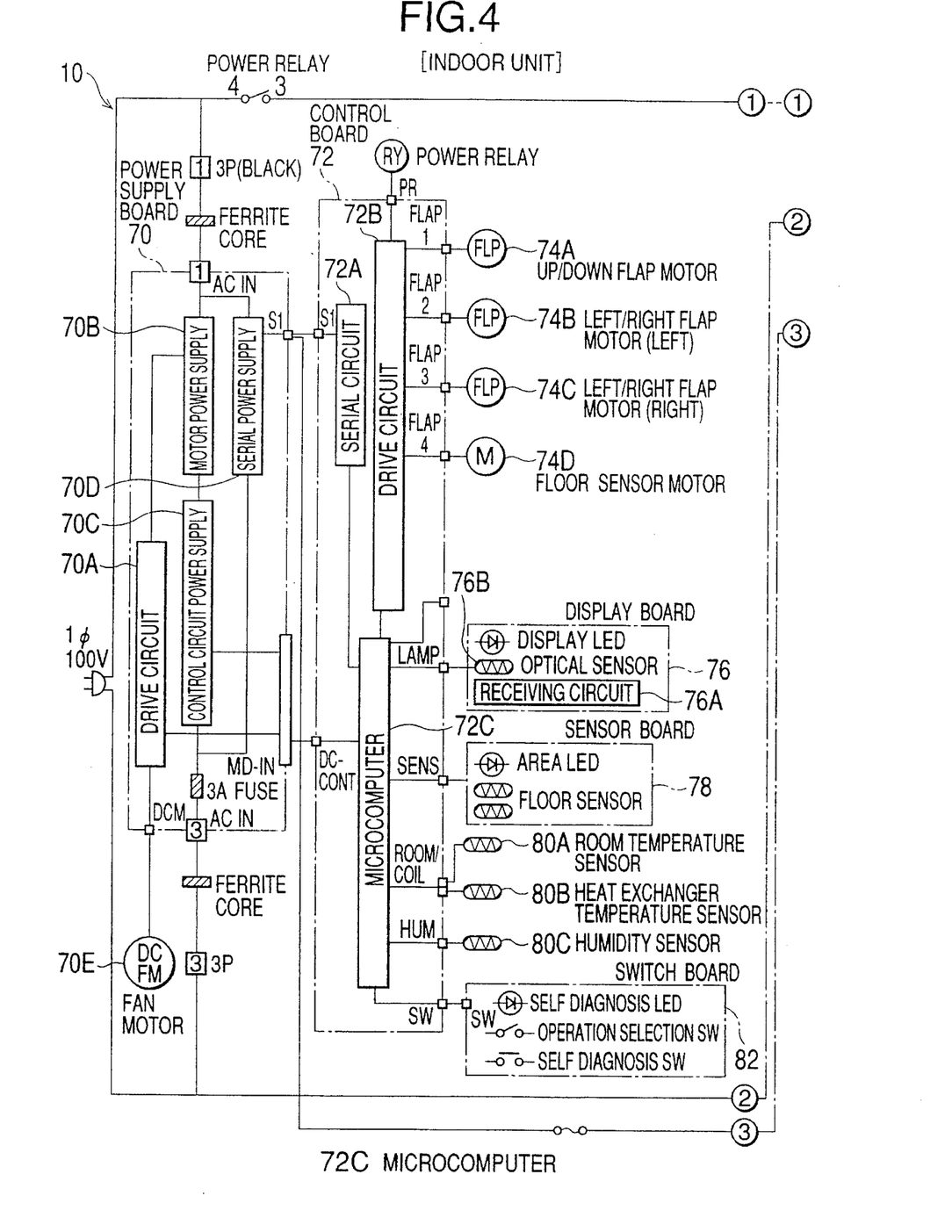
FIG. 4 is an electric circuit diagram of the indoor unit of the air conditioner according to the embodiment of the present invention.

In this embodiment, as a means for sending operation signals of the remote controller 14 to the indoor unit 10, radio waves such as infrared rays are used. The indoor unit 10 has an optical sensor 76B that receives the infrared rays (FIG. 4). The optical sensor 76B will be described later.

When an operation signal sent from the remote controller 14 is received by the optical sensor 76B of the indoor unit 10, the air conditioner controls the room temperature, humidity, and so forth corresponding to the code of the received operation signal. It should be noted that the remote controller 14 can be connected to the indoor unit with a signal line.

Figure 2:
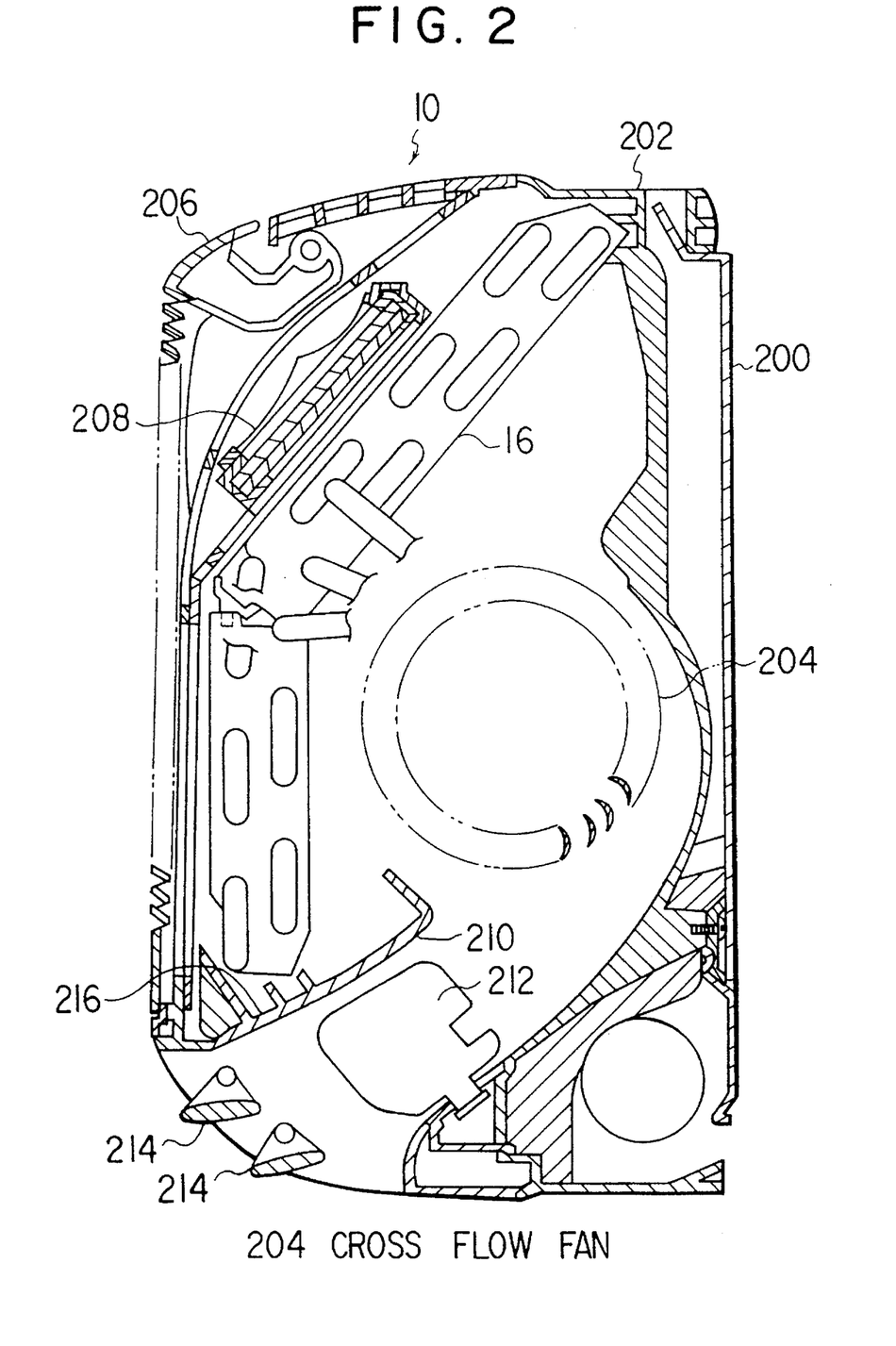
FIG. 2 is a side view showing an inner construction of an indoor unit of the air conditioner according to the embodiment of the present invention.

As shown in FIG. 2, the indoor unit 10 is covered by a casing 202. The casing 202 is detachably secured to the upper and lower edges of a mounting base 200. A cross flow fan 204 is disposed at a center portion of the casing 202. The cross flow fan 204 is driven by a fan motor 70E (that will be described later). The cross flow fan 204 sucks air into the room from a vent opening 206, through various filters 208 and a heat exchanger 16, and supplies the resultant air to the room through an air path 210. The air path 210 has a horizontal vane 212 and horizontal flaps 214 so as to adjust the direction of the air supplied to the room.

A drain pan 216 is integrally disposed at the casing 202 at the lower portion of the heat exchanger 16.

Figure 3:
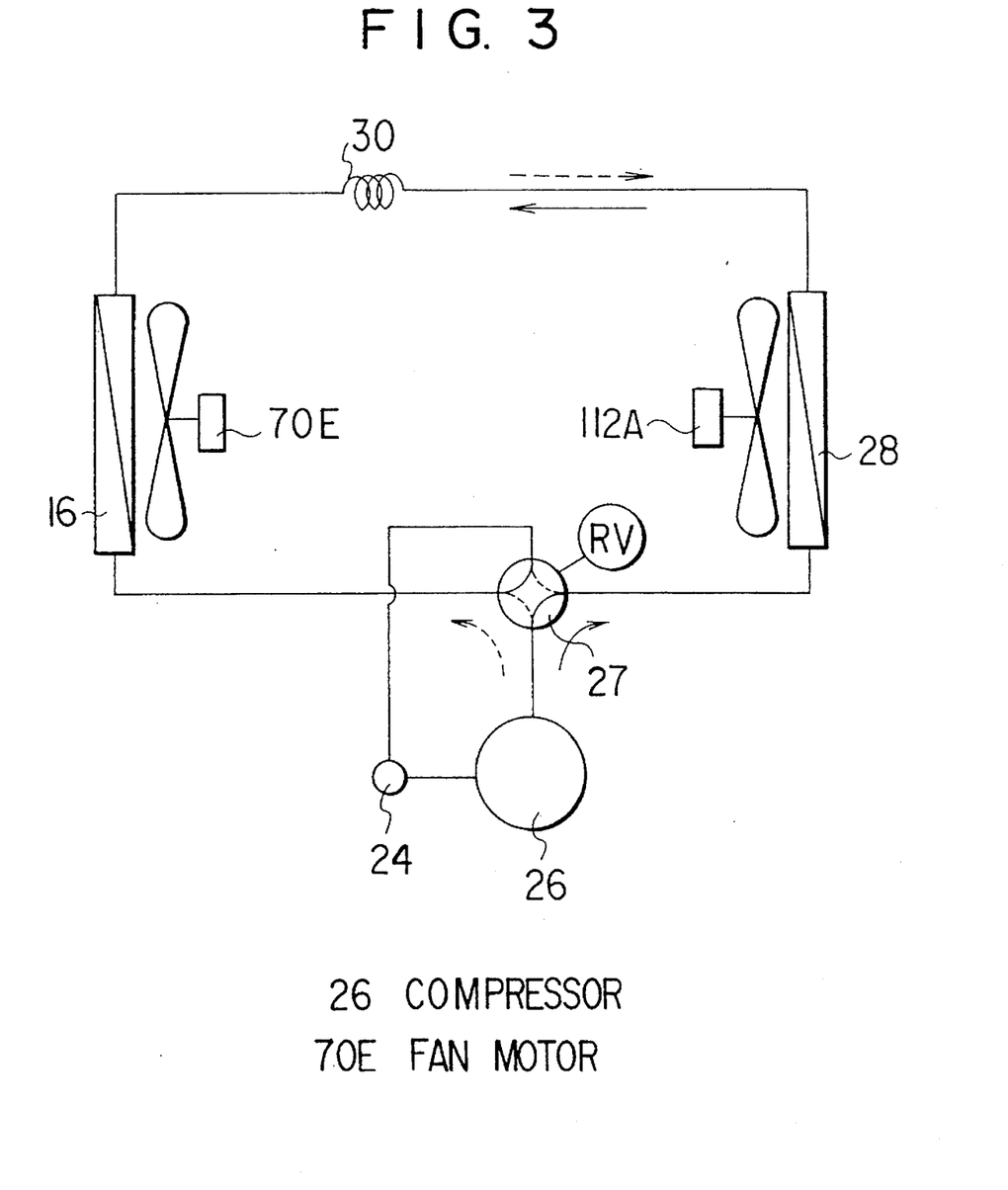
FIG. 3 is a schematic diagram showing a refrigerant circuit of the air conditioner according to the embodiment of the present invention.

FIG. 3 shows a refrigerant circuit of the air conditioner controlled by a control unit according to the embodiment of the present invention. In FIG. 3, reference numeral 26 is a compressor. Reference numeral 27 is a four-way valve. Reference numeral 28 is an outdoor heat exchanger disposed in the outdoor unit 12. Reference numeral 30 is a capillary tube. Reference numeral 16 is an indoor heat exchanger disposed in the indoor unit 10. Reference numeral 24 is an accumulator. These elements are circularly connected by a refrigerant pipe so as to construct a refrigerant cycle.

In the air conditioner, when the four-way valve 27 is placed in the state denoted by a solid line shown in FIG. 3, the refrigerant supplied from the compressor 26 flows in the direction of an arrow denoted by a solid line. Thus, the refrigerant is compressed in the outdoor heat exchanger 28. The refrigerant is evaporated by the indoor heat exchanger 16. Consequently, the room is cooled. On the other hand, when the four-way valve 27 is placed in the state denoted by a dotted line shown in FIG. 3, the refrigerant supplied from the compressor 26 flows in the direction of an arrow denoted by a dotted line. The refrigerant is compressed by the indoor heat exchanger 16. The refrigerant is evaporated by the outdoor heat exchanger 28. Consequently, the room is heated.

Reference numeral 112A is a fan motor that forms an outdoor air supplying device. Reference numeral 70E is a fan motor that forms an indoor air supplying device along with the cross flow fan 204. The fan motor 112A and the fan motor 70E cause air to be supplied to the outdoor heat exchanger 28 and the indoor heat exchanger 16, respectively.

FIG. 4 shows an electric circuit of the indoor unit 10. The electric circuit has a power supply board 70 and a control board 72. The power supply board 70 has a drive circuit 70A, a motor power supply circuit 70B, a control circuit power supply circuit 70C, and a serial circuit power supply circuit 70D. The drive circuit 70A is connected to the fan motor 70E that controls the amount of air supplied to the room. The motor power supply circuit 70B generates the power for driving various motors. The control circuit power supply circuit 70C generates power for the control circuit. The serial circuit power supply circuit 70D generates power for the serial circuit.

The control board 72 has a serial circuit 72A, a drive circuit 72B, and a microcomputer 72C. The serial circuit 72A is connected to the serial circuit power supply circuit 70D. The drive circuit 72B drives a motor. The microcomputer 72C functions as a control circuit. The drive circuit 72B is connected to an up/down flap motor 74A, left/right flap motors 74B and 74C, and a floor sensor motor 74D. The up/down flap motor 74A vertically moves a flap. The floor sensor motor 74D rotates a floor sensor that detects the temperature of the entire surface of the floor.

The microcomputer 72C is connected to a display LED, an optical sensor 76B, and a receiving circuit 76A. The display LED is disposed on the display board 76 and displays an operation mode and so forth. The receiving circuit 76A receives an operation signal as infrared rays through the optical sensor 76B from the remote controller 14.

In addition, the microcomputer 72C is connected to an area LED and a floor sensor. The area LED is disposed on a sensor board 78 and displays the temperature detected at an area of the floor.

The remote controller 14 causes the air conditioner to drive the flap motors 74A, 74B, and 74C in order to change the flap angles and so forth, thereby selecting each of the heating mode, cooling mode, dry mode, automatic operating mode, sleep mode, and so forth and changing the designated temperature, and changing the amount of air supplied.

Moreover, the microcomputer 72C is connected to a room temperature sensor 80A, a heat exchanger temperature sensor 80B, and a humidity sensor 80C. The room temperature sensor 80A detects the room temperature. The heat exchanger temperature sensor 80B detects the temperature of the refrigerant coil of the indoor heat exchanger 16. The humidity sensor 80C detects the humidity of the room. Furthermore, the microcomputer 72C is connected to a self diagnosis LED, an operation selection switch, and a self diagnosis switch that are disposed on the switch board 82. The operation selection switch selects one of the heating mode, the cooling mode, the dry mode, and the automatic operation mode.

Display LEDs corresponding to the "heating mode", "cooling mode", "dry mode", "automatic operation mode", and "sleep mode" are disposed on the display board 76 and light in accordance with the selected operation modes.

Figure 5:
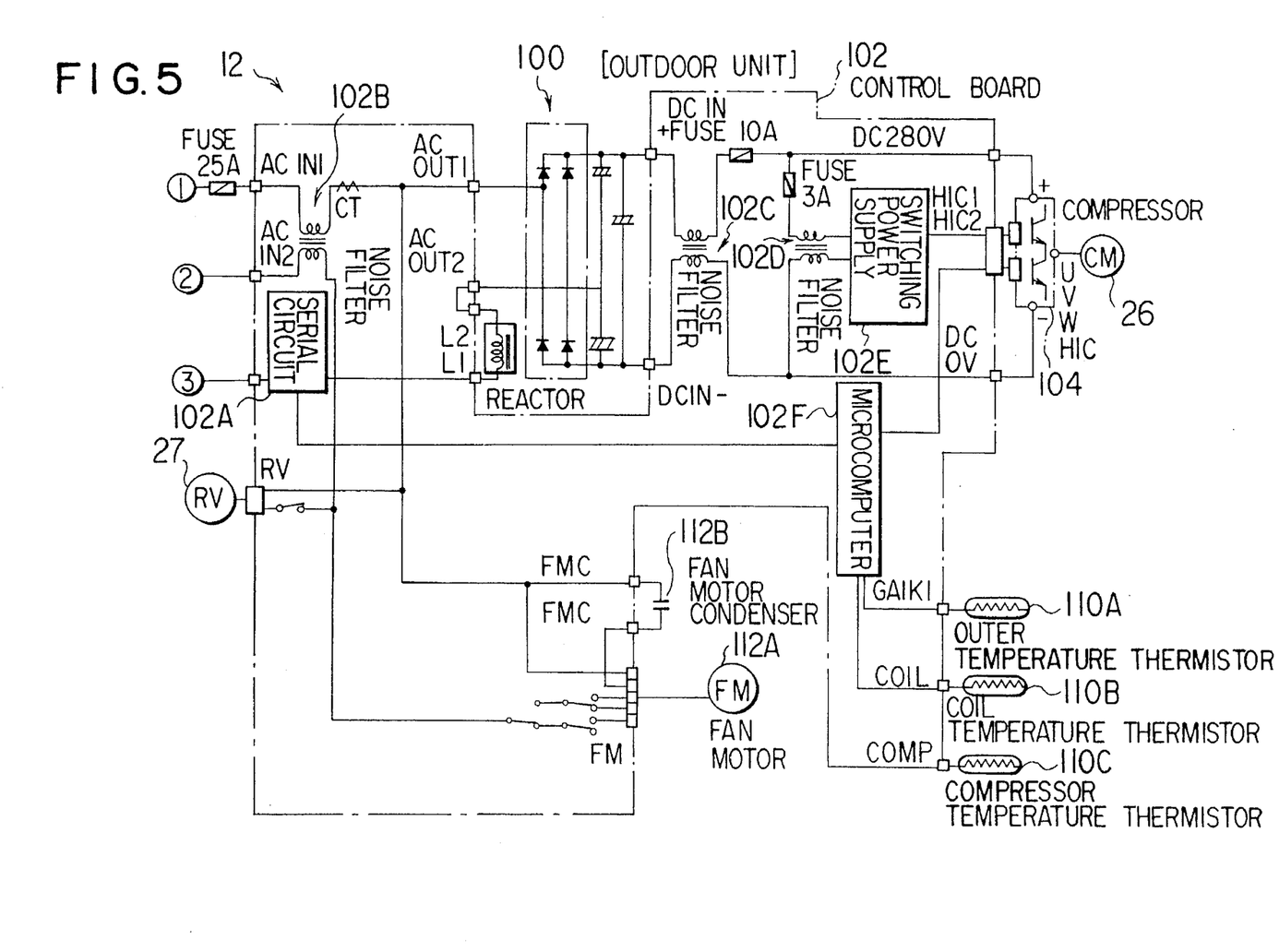
FIG. 5 is an electric circuit diagram of an outdoor unit of the air conditioner according to the embodiment of the present invention.

FIG. 5 shows an electric circuit of the outdoor unit 12. This electric circuit has a rectifier circuit 100 and a control board 102. Terminals (1) to (3) of the electric circuit of the outdoor unit 12 are connected to the electric circuit of the indoor unit 10 shown in FIG. 4.

The control board 102 has a serial circuit 102A, noise filters 102B, 102C, and 102D, a switching power supply circuit 102E, and a microcomputer 102F. The serial circuit 102A is connected to the serial circuit power supply circuit 70D of the indoor unit 10. The noise filters 102B, 102C, and 102D remove noise. The switching power supply circuit 102E generates power for switching the inverter 104. The microcomputer 102F functions as a control circuit.

The switching power supply circuit 102E is connected to the inverter 104. The inverter 104 is connected to the compressor 26, which compresses the refrigerant.

The microcomputer 102F is connected to an outer air temperature thermistor 110A, a coil temperature thermistor 110B, and a compressor temperature thermistor 110C. The outer air temperature thermistor 110A is an outer temperature sensor that detects the temperature of the outside air. The coil temperature thermistor 110B is a coil temperature sensor that detects the temperature of the refrigerant coil of the outdoor heat exchanger 28. The compressor temperature thermistor 110C is a temperature sensor that detects the temperature of the compressor 26.

The noise filter 102B is connected to a fan motor 112A and a fan motor condenser 112B. The fan motor 112A supplies air to the outdoor heat exchanger 28. In parallel with the fan motor 112A and the fan motor condenser 112B is the four-way valve 27, which valve changes the flow direction of the refrigerant supplied from the compressor 26. The valve 27 is also connected in parallel with the noise filter 102B.

Next, the operation of the embodiment of the present invention will be described. First normal operation will be described.

When the remote controller 14 is operated in the operation "stop" state and an operation signal is received by the receiving circuit 76A, the code of the received operation signal is analyzed.

It is determined whether or not the analyzed result is a "power on" command or a "timer" designating command. In the "power off" state, some operation signals of, for example, temperature designating command and air amount designating command are canceled. Thus, when such operation signals are input, they are not accepted and the receiving circuit 7 is kept in the receiving state.

When a timer designating command is detected, the user of the remote controller 14 can designate the timer so that the air conditioner will operate at a predetermined time (for example, two hours later). Thus, the remote controller 14 outputs a corresponding operation signal to the air conditioner and thereby the timer (on time) is designated in the air conditioner. Thus, the air conditioner will automatically operate two hours later.

When a "power on" command is detected, the air conditioner starts in the designated mode of the last operation.

Thereafter, when an operation signal is received from the remote controller 14, the code of the received operation signal is analyzed and it is determined whether or not the analyzed result is a power off command, an air amount designating (changing) command, a temperature designating (changing) command, or a timer designating (changing) command. Corresponding to the determined result, an item corresponding to the analyzed result is selected. Thus, the operation of the air conditioner is stopped or the designated operation mode is executed.

When the sleep mode is used, a desired temperature is designated with the temperature designating keys of the remote controller 14 and then the sleep mode switch button is pressed. With this key operation sequence, the remote controller 14 generates an operation signal. When the operation signal is received by the receiving circuit 76A, the operation signal is analyzed and it is determined that the operation signal represents the sleep mode and the designated temperature (desired temperature).

When the desired temperature and the sleep mode are designated, the fan motor 70, the compressor 26, and so forth are controlled so that the air amount and the temperature are changed to create a good sleeping environment.

Figure 6:
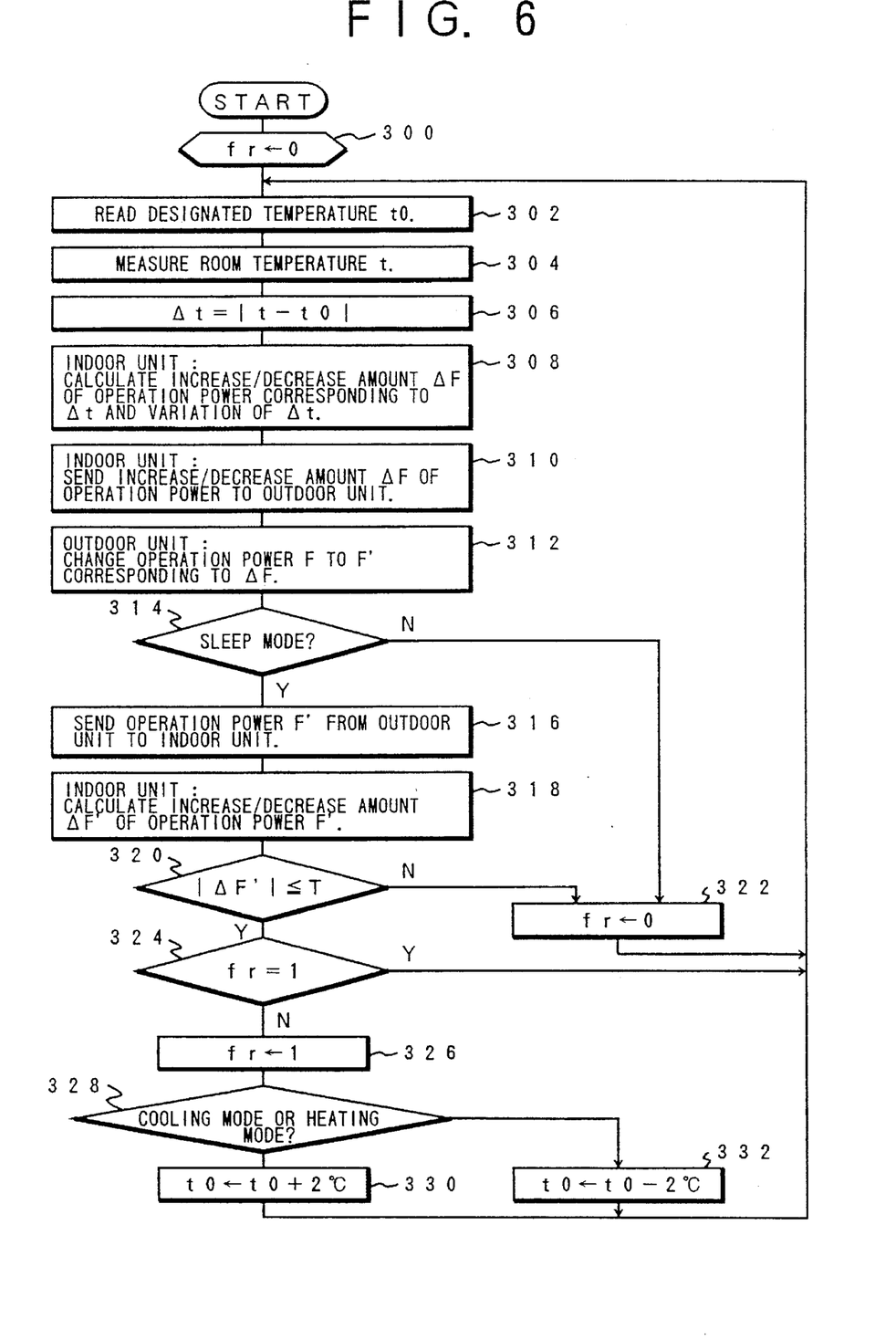
FIG. 6 is a flow chart showing a temperature shift control of the air conditioner corresponding to the embodiment of the present invention.

Next, with reference to a flow chart of FIG. 6, the temperature control of the air conditioner according to the embodiment of the present invention will be described.

At step 300, a flag for causing a designated temperature (desired temperature) shift control to be executed once is initialized. In other words, "0" is stored in a flag resister fr.

At step 302, the designated temperature t0 at the present time is stored in the register. At step 304, the room temperature t is detected by the room temperature sensor 80A.

At step 306, the absolute value |t−t0| of the room temperature and the designated temperature t0 is obtained. The absolute value |t−t0| is denoted by $\Delta t$ and stored in the register.

At step 308, the indoor unit 10 performs a fuzzy logic operation corresponding to $\Delta t$ and the variation of $\Delta t$ so as to calculate an increase/decrease amount $\Delta F$ of a frequency F for controlling the AC motor of the compressor 26.

It can be said that the frequency F for controlling the AC motor represents the operation power of the air conditioner. Thus, hereinafter, the operation power of the air conditioner, in the case that the AC motor of the compressor is controlled corresponding to the frequency F, is denoted by an operation power F.

At step 310, the increase/decrease amount $\Delta F$ of the operation power F calculated by the indoor unit 10 is sent to the outdoor unit 12 through a signal line.

At step 312, the outdoor unit 12 increases or decreases the operation power F at the time (namely, the frequency F of the AC motor) corresponding to the increase/decrease amount $\Delta F$ of the received operation power. The resultant operation power is denoted by F'. In other words, when $\Delta F$ is large, the operation power F is increased to a large amplitude. When $\Delta F$ is small, the operation power F is decreased to a small amplitude. Thus, the room temperature is caused to effectively approach the designated temperature. At this point, when an increase signal for the frequency F is received while the compressor 26 is being operated atis maximum power, the maximum power (maximum frequency) F is maintained.

The real operation power F' is compensated by the microcomputer 102F of the outdoor unit 12 according to various factors such as the current consumption of the air conditioner at the present time, the temperature of the compressor 26, and the temperature of outer air. Thus, the real operation power F' is not always changed for ΔF, which is calculated by the indoor unit 10. In addition, the operation power F' tends to converge to an operation power that is balanced with the load of the air conditioner.

At step 314, it is determined whether or not the sleep mode has been selected. When the determined result is NO, the flow advances to step 322. At step 322, "0" is stored in the flag register fr. Thus, even if the sleep mode is selected after it is cleared, the temperature shift (compensation) control is performed. Thereafter, the flow returns to step 302. At step 302, the above-described process is repeated.

On the other hand, when the determined result at step 314 is YES (namely, the sleep mode has been selected), the flow advances to the next step 316.

At step 316, the operation power F' obtained by the microcomputer 102F of the outdoor unit 12 is sent from the outdoor unit 12 to the indoor unit 10 through a signal line.

At step 318, the microcomputer 72C of the indoor unit 10 compares the received operation power F' with the operation power F stored before a predetermined time and calculates the increase/decrease amount ΔF' of the real operation power.

When ΔF' is a large positive value, the load of the air conditioner has been increased (namely, a window or a door has been opened or the room temperature exceeds the designated temperature). Thus, at this point, a large operation power is required. On the other hand, when ΔF' is a large negative value, the load of the air conditioner has been decreased (namely, the designated temperature has been changed). Thus, the required operation power becomes small. When the absolute value of ΔF' is small, the magnitude of the load is balanced with the operation power F (namely, the designated temperature t0 almost accords with the room temperature t).

At step 320, it is determined whether or not the absolute value |ΔF'| of ΔF' is a positive constant T or less. The constant T is designated in the range from 2 Hz to 5 Hz corresponding to the maximum operation power and so forth. When the determined result is NO (namely, |ΔF'| is larger than T), the flow advances to step 322. At step 322, "0" is stored in the flag resister fr. Thereafter, the flow returns to step 302. At step 302, the above-described process is repeated. Thus, even if the sleep mode is selected after it is cleared, the temperature shift control can be executed. When the determined result is YES (namely, |ΔF'| is T or less), the flow advances to step 324.

At step 324, it is determined whether or not the content of the flag register fr is "1". When the determined result is YES, the flow returns to step 302. At step 302, the above-described process is repeated. When the determined result is NO, the flow advances to the next step 326. At step 326, "1" is stored in the flag resister fr. Thus, since the temperature shift control is not executed, the designated temperature is not abnormally changed. It should be noted that for one to two hours after the start of the air conditioner, the content of the flag resister fr is kept to "0" so that the temperature shift control is performed after an elapse of the designated time period.

At step 328, it is determined whether the cooling mode or the heating mode has been selected. When the determined result is the cooling mode, the flow advances to step 330. When the determined result is the heating mode, the flow advances to step 332.

At step 330, the value of the designated temperature t0 stored in the designated temperature register is read. The value of 2° C. added to t0 is stored in the designated temperature resister. Thereafter, the flow returns to step 302. At step 302, the temperature control is performed corresponding to the designated temperature increased by 2° C. Of course, since the value of the flag register fr is "1", the designated temperature shift control is not performed. Unless the sleep mode is cleared, the changed designated temperature is maintained. Thus, the room temperature is not abnormally changed.

It should be noted that an automatic temperature restoring function can be provided so that the initially designated temperature is restored when the sleep mode is cleared after the temperature shift control is performed.

At step 332, the value of the designated temperature t0 stores in the designated temperature resistor is read. The value of 2° C. subtracted from t0 is stored in the designated temperature register. Thereafter, the flow returns to step 302. At step 302, the temperature control is performed for the designated temperature decreased by 2° C. Likewise, while the designated temperature is maintained, the temperature control is performed.

In the embodiment, 2° C. was used as the temperature shift amount. However, the temperature shift amount should be designated corresponding to the typical temperature decrease of the user who is sleeping. Thus, the temperature shift amount may be other than 2° C. Alternatively, the temperature shift amount may be selected by the user. As another alternative method, the temperature shift amount may be a function of the room temperature or a function of the designated temperature, not a constant thereof. As a further other alternative method, the temperature shift amount in the heating mode may be a function that is different from the function of the temperature shift amount in the cooling mode. Thus, the temperature shift amount can be selected corresponding to each application.

Figure 7:
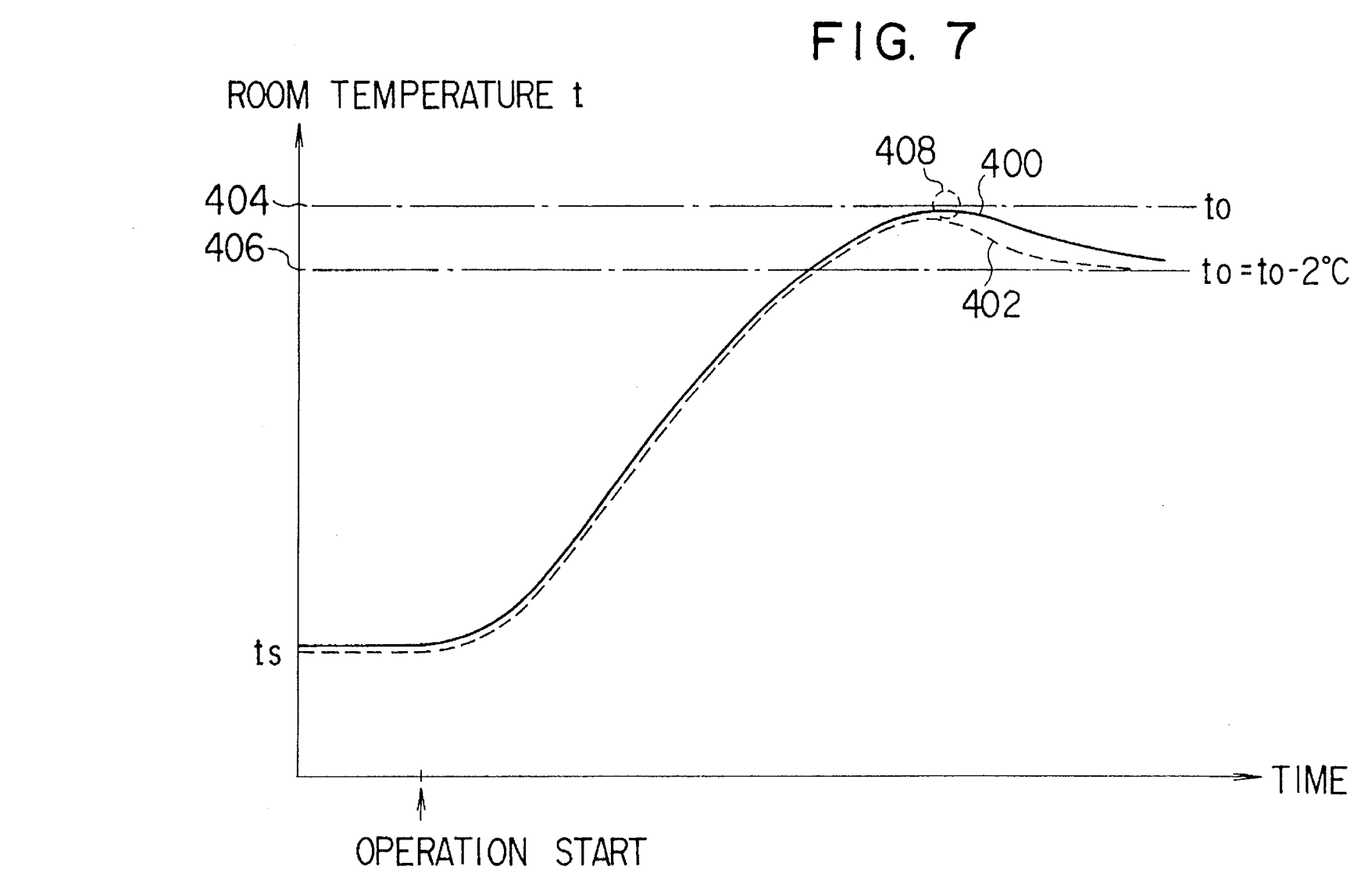
FIG. 7 is a graph showing a time change of a room temperature t in a heating mode.
Figure 8:
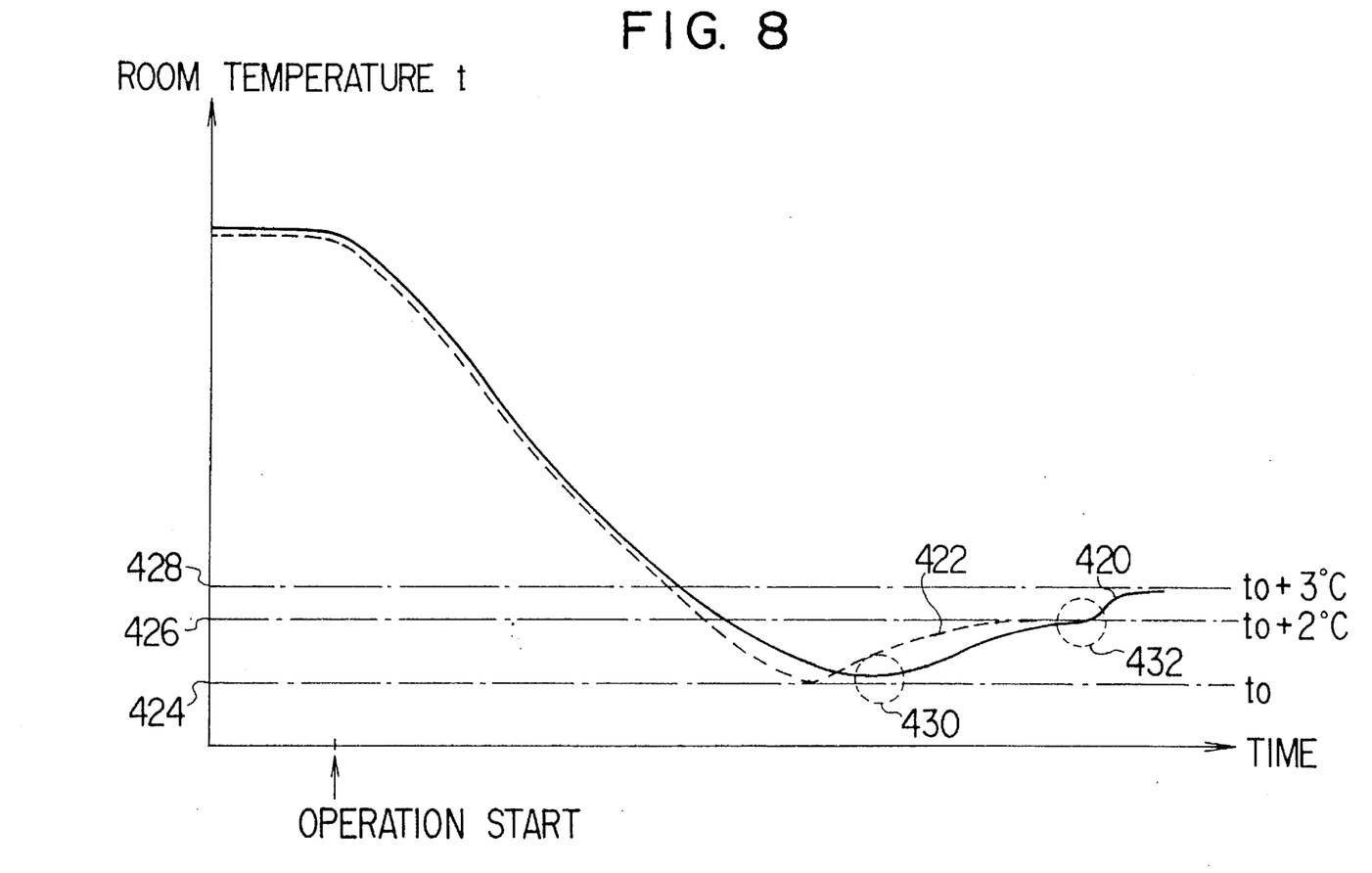
FIG. 8 is a graph showing a time change of a room temperature t in a cooling mode

FIGS. 7 and 8 are graphs showing time changes of the room temperature t in the case that the above-described operation power control is performed.

FIG. 7 is a graph showing a time change of the room temperature t in the case where the room temperature t is caused to approach to the designated temperature t0 in the heating mode. In FIG. 7, a solid line 400 is a curve that represents a time change of the room temperature t in the case where the temperature shift control is performed corresponding to the embodiment of the invention. A dashed line 402 is a curve that represents a time change of the room temperature t in the case where a conventional temperature shift control is performed.

On the solid line 400, after the start of the operation, the room temperature t increases from the initial room temperature ts and asymptotically approaches a straight line 404 that represents the designated temperature t0. In this case, the variation width ΔF' of the real operation power gradually decreases. When the solid line 400 reaches a small circle 408, it is determined that ΔF' is T (for example, 3 Hz) or less. Thereafter, the designated temperature t0 is shifted to t0−2° C. Thus, the solid line 400 asymptotically approaches a straight line 406. Consequently, the room temperature t is maintained at the designated temperature t0–2° C.

On the dashed line 402, after the start of the operation, the room temperature t increases from the initial room temperature ts as with the solid line 400. However, when the room temperature t almost accords with the designated temperature t0, the designated temperature is shifted to t0–2° C. Thus, the dashed line 402 parts from the solid line 400. Thereafter, the dashed line 402 asymptotically approaches the straight line 406. Thus, the room temperature t is maintained at the designated temperature t0–2° C.

FIG. 8 is a graph showing a time change of the room temperature in the case where the room temperature t is caused to approach to the designated temperature t0 in the cooling mode. In FIG. 8, a solid line 420 is a curve that represents a time change of the room temperature t in the case where the temperature shift control is performed corresponding to the embodiment of the invention. A dashed line 422 is a curve that represents a time change of the room temperature t in the case where the conventional temperature shift control is performed.

On the solid line 420, after the start of the operation, the room temperature t decreases from the initial room temperature ts. Thereafter, the solid line asymptotically approaches a straight line 424 that represents the designated temperature t0. In this case, the variation width ΔF' of the real operation power gradually decreases. When the solid line 420 reaches a small circle 430, it is determined that ΔF' is T (for example, 3 Hz) or less. At this point, the frequency for maintaining the designated temperature is designated. Thus, the designated temperature is maintained. Thereafter, the designated temperature t0 is shifted to t0+2° C. Thus, the solid line 420 asymptotically approaches a straight line 406. The room temperature t is maintained at the designated temperature t0+2° C.

When the designated temperature shift control is performed twice, the following control is performed. When the room temperature t approaches the shifted designated temperature t+2° C., the variation width ΔF' of the operation power decreases. When the solid line 420 reaches a small circle 432, it is determined that ΔF' is T (for example, 3 Hz) or less once again. Thereafter, the designated temperature t0+2° C. is shifted to t0+3° C. once again. Thus, the control operation for the designated temperature t0+3° C. is performed.

On the dashed line 422, after the start of the operation, the room temperature t decreases from the initial room temperature ts as with the solid line 420. However, when the room temperature t almost accords with the designated temperature t0, the designated temperature is shifted to t0+2° C. Thus, the dashed line 422 parts from the solid line 420 and asymptotically approaches a straight line 426 that represents the designated temperature t0+2° C. Thus, the room temperature t is maintained at the designated temperature t0+2° C.

As described above, according to the embodiment, when the variation width ΔF' of the frequency for controlling the AC motor converges to a predetermined range, it is determined that the power of the air conditioner that is operating approaches the predetermined range of the power for maintaining the designated temperature. Thereafter, the temperature shift control is performed. Thus, even if the body temperature of the user decreases due to sleeping or the like, the air conditioner can provide the user with a comfortable sleeping environment.

Consider the case where the power of the air conditioner converges to an operation power where the load of the air conditioner is balanced with the operation power at a temperature that is different from the designated temperature (desired temperature) and thereby the operation of the air conditioner becomes stable. The conventional air conditioner performs the temperature shift control corresponding to the difference between the designated temperature and the room temperature, it cannot detect a match of the room temperature and the designated temperature. Thus, the air conditioner may not occasionally change the designated temperature. However, according to the embodiment of the present invention, even if the operation of the air conditioner becomes stable, since the air conditioner can detect a decrease of the of the absolute value of the power difference ΔF of the operation power, it can determine an occurrence of the stable state of the operation and thereby properly perform the designated temperature shift control.

The present invention is not limited to the above-described embodiment. For example, in the above-described embodiment, as a means for representing the power of the air conditioning, the frequency for controlling the AC motor was used. However, another means can be used as long as it accurately represents the power of the air conditioner. For example, by controlling the voltage applied to a DC motor, the power of the air conditioner (the number of rotations of the DC motor) can be controlled.

In addition, as a means for determining whether or not the power of the air conditioner that is operating is approaching a predetermined range necessary for maintaining a designated temperature, another method using other than ΔF' can be used. For example, a method for estimating a power K0 for maintaining the predetermined temperature and for comparing K0 with a present power K of the air conditioner can be used. In other words, any method can be used as long as it can be determined whether or not the power of the air conditioner becomes stable at a temperature near the predetermined temperature and whether or not the power of the air conditioner approaches the predetermined range.

According to the embodiment of the present invention, the temperature shift control was performed in the sleep mode. However, the temperature shift control can be performed in another mode as long as it prevents the designated temperature from becoming improper due to, for example, a change of the body temperature of the user. In addition, the number of times the temperature shift control occurs can be three or more, it is not limited to one and two.

As described above, according to the air conditioner of the present invention, when the sleep mode or the like is selected, the variation of the frequency for controlling the rotation of the motor of the compressor is detected. When the variation converges to the predetermined range, the designated (desired temperature) is shifted (compensated) to the predetermined temperature. Thus, the air conditioner of the present invention can provide a user with a comfortable sleeping temperature environment although the body temperature of the user decreases. In addition, even if the load of the air conditioner is balanced with the operation power at a temperature that is different from the designated temperature and thereby the operation becomes stable, since the stable state can be determined, the same effect can be accomplished. Moreover, since the temperature shift control is occasionally performed before the room temperature reaches the designated temperature, the present invention contributes to energy saving.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An air conditioner for varying an air conditioning power and for causing a room temperature to approach a designated temperature, comprising:

determining means for determining whether or not the current air conditioning power is approaching a predetermined range of the air conditioning power required for maintaining the designated temperature and for generating a corresponding signal; and compensating means for changing the designated temperatures in accordance with the signal that is generated by said determining means.

2. The air conditioner as set forth in claim 1, further comprising:

a switch, wherein said compensating means functions when said switch is enable.

3. The air conditioner as set forth in claim 2, wherein said compensating means is adapted for decreasing the designated temperature when the operation of said air conditioner is in a mode for heating the room.

4. The air conditioner as set forth in claim 2, wherein said compensating means is adapted for increasing the designated temperature when the operation of said air conditioner is in a mode for cooling the room.

5. The air conditioner as set forth in claim 2, wherein said compensating means is adapted for decreasing the designated temperature when the operation of said air conditioner is in a mode for heating the room, and wherein said compensating means is adapted for increasing the designated temperature when the operation of said air conditioner is in a mode for cooling the room.

6. The air conditioner as set forth in claim 5, wherein said compensating means is adapted for compensating the designated temperature according to a change of the body temperature of a user who is sleeping in the room.

7. The air conditioner as set forth in claim 6, wherein said compensating means is adapted for compensating the designated temperature a plurality of times.

8. The air conditioner as set forth in claim 1 wherein said compensating means changes the designated temperature by a predetermined fixed amount.

9. The air conditioner as set forth in claim 1 wherein said determining means determines the air conditioning power as a function of the AC compressor motor drive frequency.

10. The air conditioner as set forth in claim 9 wherein said compensating means changes the designated temperature by 2° C. and the predetermine range is a 3 Hz range of the motor drive frequency.

11. An air conditioner for air conditioning a room with a refrigerating cycle using a compressor, a condenser, an expansion device, and an evaporator, comprising:

a room temperature designating device for designating a desired temperature of the room;

a control mechanism for controlling the power of the compressor according to the difference between the desired temperature designated by said designating device and the temperature of the room;

determining means for determining whether the power controlled by said control mechanism approaches a predetermined range of the power necessary for maintaining the desired temperature and for generating a corresponding signal; and compensating means for changing the desired temperature according to the signal that is generated by said determining means.

12. The air conditioner as set forth in claim 11, further comprising:

a switch, wherein said compensating means functions when said switch is enabled.

13. The air conditioner as set forth in claim 12, wherein said compensating means is adapted for decreasing the desired temperature when the operation of said air conditioner is in a mode for heating the room.

14. The air conditioner as set forth in claim 12, wherein said compensating means is adapted for increasing the desired temperature when the operation of said air conditioner is in a mode for cooling the room.

15. The air conditioner as set forth in claim 12, wherein said compensating means is adapted for decreasing the desired temperature when the operation of said air conditioner is in a mode for heating the room, and wherein said compensating means is adapted for compensably increasing the desired temperature when the operation of said air conditioner is in a mode for cooling the room.

16. The air conditioner as set forth in claim 15, wherein said compensating means is adapted for changing the desired temperature according to a change of the body temperature of a user who is sleeping in the room.

17. The air conditioner as set forth in claim 16, wherein said compensating means is adapted for compensating the desired temperature a plurality of times.

18. The air conditioner as set forth in claim 11 wherein said compensating means changes the desired temperature by a predetermined fixed amount.

19. The air conditioner as set forth in claim 11 wherein said determining means determines the air conditioner power as a function of an AC compressor motor drive frequency.

20. The air conditioner as set forth in claim 19 wherein said compensating means changes the desired temperature by 2° C. and the predetermined range is a 3 Hz range of the motor drive frequency.

* * * * *